(12) United States Patent
Hartwich

(10) Patent No.: US 7,769,056 B2
(45) Date of Patent: Aug. 3, 2010

(54) COMMUNICATION MODULE HAVING A COMMUNICATION INTERFACE ELEMENT AND COMMUNICATION INTERFACE ELEMENT

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 11/661,075

(22) PCT Filed: Jun. 27, 2005

(86) PCT No.: PCT/EP2005/052986

§ 371 (c)(1),
(2), (4) Date: Feb. 28, 2008

(87) PCT Pub. No.: WO2006/024558

PCT Pub. Date: Mar. 9, 2006

(65) Prior Publication Data

US 2008/0259915 A1    Oct. 23, 2008

(30) Foreign Application Priority Data

Aug. 27, 2004  (DE) ................. 10 2004 041 823

(51) Int. Cl.
*H04J 3/04* (2006.01)
(52) U.S. Cl. .............. 370/535; 370/489; 370/254; 370/257; 370/389; 709/227
(58) Field of Classification Search ......... 370/200–253, 370/272–390, 431–546; 709/227
See application file for complete search history.

(56) References Cited

U.S. PATENT DOCUMENTS

| | | | |
|---|---|---|---|
| 4,602,363 A * | 7/1986 | Das et al. | 370/360 |
| 4,752,924 A * | 6/1988 | Darnell et al. | 370/431 |
| 5,703,875 A | 12/1997 | Burnett | |
| 6,223,242 B1 * | 4/2001 | Sheafor et al. | 710/317 |
| 6,457,087 B1 * | 9/2002 | Fu | 710/305 |
| 2005/0021764 A1 * | 1/2005 | Barrall et al. | 709/227 |
| 2007/0044131 A1 * | 2/2007 | Yoshida | 725/116 |

FOREIGN PATENT DOCUMENTS

DE   102 11 285   11/2002
EP   1 189 393    3/2002

OTHER PUBLICATIONS

Ekiz et al., "Performance Analysis of a CAN/CAN Bridge," Oct. 29, 1996, pp. 181-188, Proceedings of the International Conference on Network Protocols +.

* cited by examiner

*Primary Examiner*—Ricky Ngo
*Assistant Examiner*—Iqbal Zaidi
(74) *Attorney, Agent, or Firm*—Kenyon & Kenyon LLP

(57) ABSTRACT

A communication interface element for a communication module is provided, which module contains a message memory and a first data path to and from the message memory via which data and/or messages are transmitted to and from the message memory. The communication interface element provides an additional, second data path in the communication module and includes switching arrangement configured in such a way that predefinable data and/or messages of the first data path are transmitted over the additional, second data path.

8 Claims, 3 Drawing Sheets

COMMUNICATION MODULE HAVING A COMMUNICATION INTERFACE ELEMENT AND COMMUNICATION INTERFACE ELEMENT

BACKGROUND OF THE INVENTION

1. Field of the Invention

The present invention relates to a communication interface element and a method for exchanging data and/or messages between at least two communication modules.

2. Background Information

Interconnection of control units, sensors, and actuators, using a communication system that has a communication link, in particular a bus, and corresponding communication modules has drastically increased in the past few years in construction of modern motor vehicles, in mechanical engineering, in the machine tool industry in particular, as well as in automation. Synergetic effects as a result of the distribution of functions to a plurality of stations, in particular control units, may thus be achieved. This is known as a distributed system. Such distributed systems or networks thus have stations and the bus system or a plurality of bus systems connecting these stations. Communication between different stations increasingly takes place via such a communication system or bus system via which the data to be transferred is transmitted in messages. This communication traffic on the bus system, access and receiving mechanisms, as well as error processing are regulated via an appropriate protocol.

CAN (controller area network) has been established, for example, as a protocol in the automotive industry. This is an event-controlled protocol, i.e., protocol activities such as transmission of a message are initiated by events originating outside the communication system. Unambiguous access to the communication system, i.e., bus system, is accomplished via priority-based bit arbitration. This assumes that the data to be transmitted, and thus each message, is assigned a priority. The CAN protocol is very flexible; further stations and messages may be added without any problem as long as free priorities (message identifiers) are still available. The collection of all messages and their respective priorities to be transmitted in the network and their transmitting and receiving stations, i.e., the respective communication modules, are saved in a list, known as the communication matrix.

An alternative approach to event-controlled, spontaneous communication is the purely time-controlled approach. All communication activities on the bus are strictly periodical. Protocol activities such as the transmission of a message are triggered by the progression of a time which is valid for the entire bus system. Access to this medium is based on the assignment of time segments in which a transmitter has exclusive transmission rights. The order of messages must usually be determined before start-up. This means that a schedule is prepared which satisfies the requirements of the messages with respect to repetition rate, redundancy, deadlines, etc. This is referred to as a bus schedule. TTP/C is such a bus system, for example.

The approach of the time-controlled CAN, known as TTCAN (time-triggered controller area network) combines the advantages of both above-mentioned bus types. It meets the above-outlined requirements according to time-controlled communication, as well as the flexibility requirements to some degree. The TTCAN meets these requirements by setting up the communication round in exclusive time windows for periodic messages of certain communication stations and in arbitrating time windows for spontaneous messages of a plurality of stations. TTCAN is essentially based on time-controlled, periodic communication which is timed by a station or communication module that defines the utilization time, known as the time master, with the aid of a time reference message.

Another option for combining different types of transmission is provided by the Flex-Ray protocol, which describes a fast, deterministic, and error-tolerant bus system, in particular for use in a motor vehicle. This protocol works according to the time-division multiple-access (TDMA) method, in which the stations or the messages to be transmitted are assigned fixed time slots in which they have exclusive access to the communication link, i.e., the bus. The time slots are repeated in a pre-established cycle, so that the time at which a message is transmitted over the bus may be accurately predicted, and bus access takes place deterministically. In order to utilize the bandwidth for message transmission on the bus system, the cycle is subdivided into a static and a dynamic part. The fixed time slots are located in the static part at the beginning of a bus cycle. In the dynamic part, the time slots are dynamically defined. Exclusive bus access is enabled therein only for a short time period, referred to as minislots.

As shown, there is a plurality of different transmission technologies and thus types of bus systems. It is often required that a plurality of bus systems of the same type or different types be connected to one another. A bus interface unit, known as a gateway, is used for this purpose. A gateway is therefore an interface between different buses, which may be of the same type or different types, the gateway conveying messages from one bus to one or more other buses. Known gateways have a plurality of independent communication modules, messages being exchanged via the processor interface (CPU interface) of the particular station or the corresponding interface module of the particular communication module. This data exchange places a heavy load on the CPU interface in addition to that of the messages to be transmitted to the station itself, which, together with the resulting transmission structure, results in a relatively low data transmission rate. Furthermore, there are integrated communication controllers or communication modules which share a common message buffer, known as a message memory, and thus compensate for the structural disadvantages. However, such integrated communication modules are therefore very inflexible with respect to the data transmission and are in particular designed for a defined number of bus connections.

It is apparent that the related art has not succeeded in delivering optimum results in all respects.

BRIEF SUMMARY OF THE INVENTION

An object of the present invention is to provide a communication module and a communication interface element, as well as a method making it possible to improve the exchange of data and/or messages.

In particular, the exchange of data and/or messages between a plurality of communication modules is made possible without placing a heavy load on the CPU interface and without making a plurality of message memories dependent on one another. At the same time, the transmission rate is to be increased and flexible transmission is to be made possible.

This is achieved in particular by implementing a communication interface element as a special gateway interface, which is connected between the message memories, i.e., in the corresponding data paths, and thus enables a new, additional data path.

The present invention presents a communication interface element and a corresponding communication module, which contains a message memory, a first data path being provided to and from the message memory, over which data and/or messages are routed to and from the message memory, the said communication interface element advantageously providing an additional, second data path in the communication module and containing switching means designed in such a way that predefinable data and/or messages of the first data path are transmitted over the additional, second data path.

The communication interface element advantageously contains a first switching means and a second switching means, which makes insertion and/or extraction of predefinable data and/or messages into or from the first data path and/or into or from the second data path possible.

The switching means is/are advantageously designed as multiplex module(s).

A control unit which controls the switching means is advantageously assigned to the communication interface element. According to a first embodiment, this control unit is contained in the communication interface element in particular. According to a second embodiment, the control unit may, however, also advantageously be installed in the communication module or, according to a third embodiment, in the station assigned to the communication module.

The control unit controls the transmission of data and/or messages over the second, additional data path and defines which data and/or messages are transmitted on the second data path and/or transferred from the second data path into the corresponding message memory, i.e., onto the first data path.

This control unit may be implemented as either software or hardware in all three embodiments.

In addition to the communication interface element, the present invention also advantageously has a communication module having such a communication interface element in particular, an additional, second data path being provided in the communication module, which also contains switching means designed in such a way that outputtable data and/or messages of the first data path are transmitted over the additional, second data path.

It is especially advantageous that such communication modules and corresponding communication interface elements make it possible to implement a system having at least two such communication modules as a gateway, and to connect the communication modules over the additional, second data paths, to connect these in an annular shape in particular, and thus to make fast and flexible transmission possible.

Furthermore, the present invention presents a method for exchanging data and/or messages between at least two communication modules, each of which contains a message memory, data and/or messages being transmitted to and from the message memory via a first data path in each communication module, and an additional, second data path being advantageously provided, over which predefinable data and/or or messages of the first data path are transmitted, the communication modules being connected via the second data path(s) and the predefinable data and/or messages thus being exchanged between the communication modules.

The following advantages thus result from the present invention: a higher rate in transmitting data and/or messages via the communication interface element compared to the CPU interface, as well as a very flexible and free configurability of the transmission; this is possible in particular due to a very flexible and free definition of the number of bus connections compared to an integrated communication module or an integrated gateway.

DETAILED DESCRIPTION OF THE INVENTION

Figure 1:
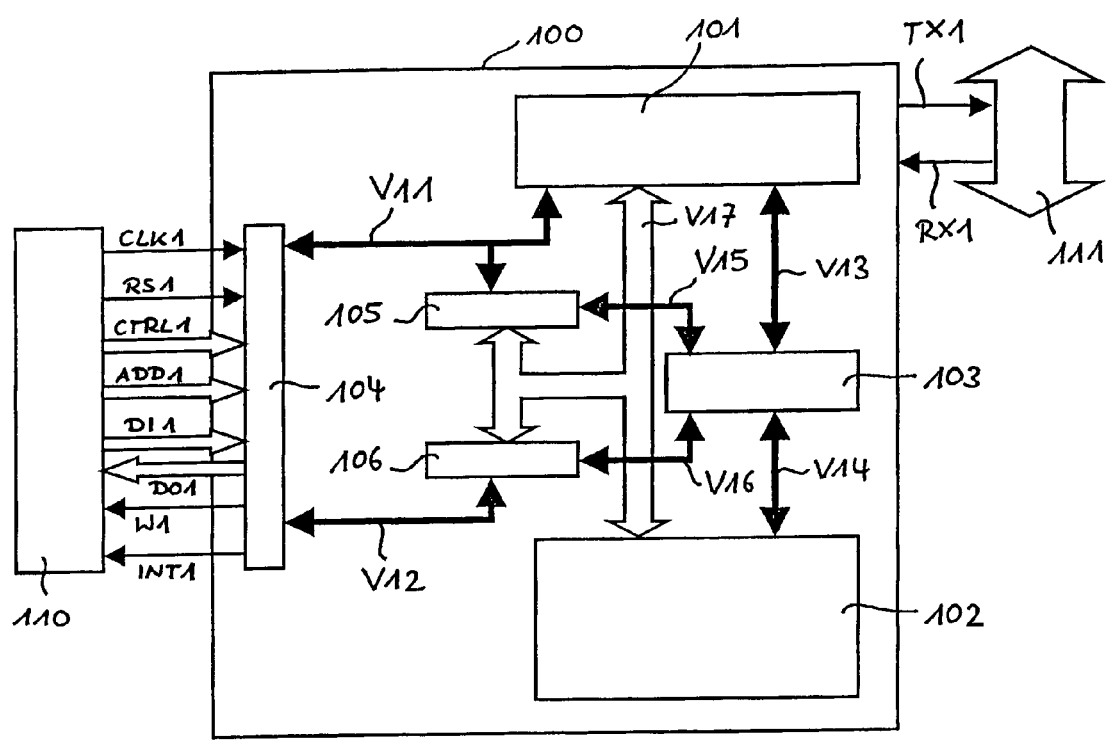
FIG. 1 shows a communication module of a bus system, e.g., a CAN bus system.

FIG. 1 schematically shows a communication module 100 for connecting a station or host 110 or its CPU execution unit to a communication link or a bus 111. For this purpose, communication module 100 is connected to station 110, or to the CPU of station 110 as part of the CPU interface, via interface module 104. A timer (clock) input is labeled CLK1, a reset input is labeled RS1, a control input is labeled CTRL1, an address input is labeled ADD1, a data input is labeled DI1, a data output is labeled DO1, an output providing a wait signal is labeled W1, and an output for interrupt signals is labeled INT1.

The content of this communication module 100 is described below, the functionality corresponding to the particular bus system and the communication module, a CAN communication module, having been selected as examples here. The present invention may, however, be used with any other communication modules or communication controllers, as well as other bus systems and bus protocols, so that the selected depiction in the following figures and exemplary embodiments is not to be considered as limiting in this respect. In particular, it may also have a dual-channel design, for example, for a Flex-Ray protocol. However, the CAN or TTCAN application is an advantageous and preferred embodiment.

For this purpose, communication module 100 contains a control unit 101, in this case a CAN control unit or a CAN core in particular. In addition, the figure shows a message memory, designed as a message RAM in particular, as a single-ported RAM 102, for example. A dual-ported RAM may be used, for example, in a dual-channel application, in a Flex-Ray application, for example. Two buffer memories, register modules in particular, which are used for buffering the data or message transfers and may also contain the appropriate assignments for the appropriate memory location in the message memory, are labeled 105 and 106. In this embodiment, two registers 105 and 106 are shown as an example only; a single register or a register divided into two memory areas may also be used. The data and message transfer is controlled via a message handler 103.

First register 105 (as a CPU IFC register, for example) is connected to interface module 104 and to control unit 101 via link V11. In addition, second register 106 is connected to interface module 104. The two registers are connected to message handler 103 via links V15 and V16, respectively. The message handler itself is connected to control unit 101 via link V13 and to message memory 102 via V14. The actual message exchange, i.e., message transmission, takes place via link V17, which represents more or less the first data path (i.e., a substantial portion thereof) and establishes a link between control unit 101, message memory 102, and registers 105 and 106.

If a gateway, in particular a CAN gateway, is constructed from the communication modules shown in FIG. 1, the data transfer, i.e., transmission of data and/or messages between the communication modules, requires a plurality of read and write operations, which must be performed, like the data transfer, via the CPU bus (CPU interface) and thus place a heavy load on the host CPU, i.e., station 110, and thus slow down the transmission.

Bus terminals TX and RX, in this case TX1 on the transmit side and RX1 on the receive side, are the links to bus 111. In an integrated gateway, however, these are predefined fixedly and inflexibly.

Figure 2:
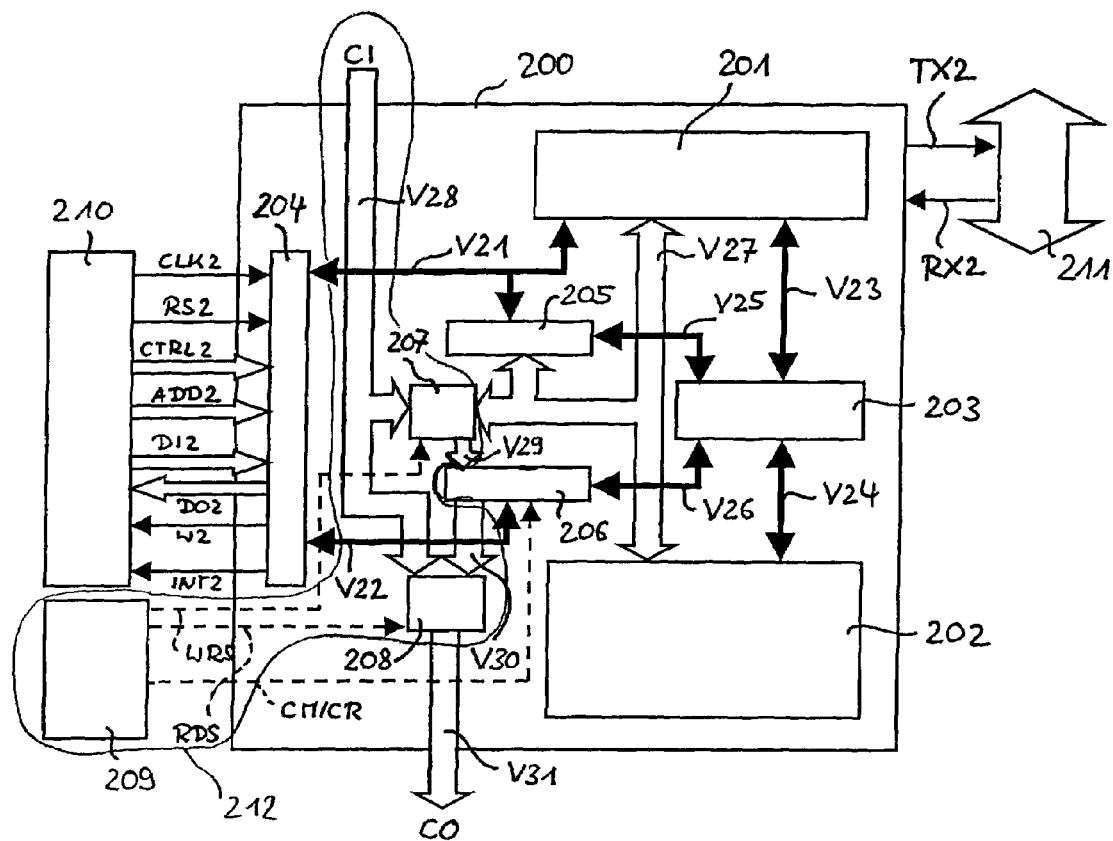
FIG. 2 shows a communication module according to the present invention having a communication interface element.

To overcome this shortcoming, a communication interface element 212 is now proposed according to FIG. 2, which is elucidated in detail below in connection with communication module 200. The explanations given for components 100 through 111 and V11 through V17 of FIG. 1 also apply, of course, to the corresponding components 200 through 211 (except 207 through 209 and 212) and V21 through V27 of FIG. 2. FIG. 2 thus essentially represents the communication module of FIG. 1 including the extension according to the present invention (207 through 209 and 212 and V28 through V31), so that the embodiments of FIGS. 1 and 2 may be seen together.

Communication module 200 connects a station 210 or host, i.e., a host CPU, to a bus 211, the bus terminals being depicted as TX2 and RX2 corresponding to transmit output (TX2) and receive input (RX2). This communication module 200 also contains a control unit 201, in particular as a CAN core, a message memory 202, in particular as a message RAM, a message handler 203, the two exemplary registers, here labeled 205 and 206 (the explanations for registers 105 and 106 apply as stated above), as well as the interface module to host 210, here labeled 204. The interface module contains inputs for clock CLK2, reset RS2, a control input CTRL2, an address input ADD2, and a data input DI2. Furthermore, outputs DO2 are provided as data output, a wait signal W2, and an interrupt output INT2. Also in this example, register 205 is coupled to control unit 201 and interface module 204, here via link V21. Register 206 is also coupled here to interface module 204 via link V22. In the same way, the two exemplary registers 205 and 206 are also in this case connected to message handler 203 via links V25 and V26. Control unit 201 is connected to message handler 203 via link V23 and the message handler is connected to message memory 202 via link V24. Also in this case the message handler controls the actual transmission of data and/or messages between bus 211 and host 210.

The first data path labeled V17 in FIG. 1 is labeled V27 here and includes a specific feature by being connected to communication interface element 212, i.e., the gateway interface, instead of second register 206. This means that the gateway interface is located in the first data path, here V27, or is connected to this first data path V27. Communication interface element 212 (gateway interface) is connected to first data path V27 to and from message memory 202 and has advantageously the same word width for the transmission as message memory 202 itself. However, an integer fraction or an integer multiple, in particular of the word width, would also be conceivable. The data and/or message transmission is adapted according to the particular bus protocol, for example, a CAN message having control bits and status bits in the case of CAN. This may be configured according to the particular bus system.

An additional, second data path having an input CI (cascade input) and an output CO (cascade output) is thus implemented in communication module 200 via links V28, V29, V30, V31 and switching means 207 and 208. The two switching means 207 and 208 depicted in this example are designed in particular as multiplexers or multiplex modules. In the preferred embodiment depicted here, two switching means 207 and 208 are thus used; however, the use of a single switching means is also conceivable.

Predefinable data and/or messages of the first data path may thus be transmitted over the additional, second data path without placing a load on host CPU 210 according to the normal data path.

Control of this second data path, i.e., the transmission of data and/or messages over the second data path and, in particular the selection or definition of the predefinable data and/or messages, takes place via a control unit 209, which is designed as a finite state machine in particular (FSM). This control unit 209 as a state machine in particular may be installed in communication module 200 itself or assigned to it but located outside of it. In particular, in one embodiment, it may be contained in station 210, the host. In one embodiment it is contained directly in gateway interface 212, i.e., in the communication interface element. The first switching means, multiplex module 207, is triggerable via a write select (WRS) output. The second switching means, multiplex module 208, is triggerable via a second output, a read select (RDS) output. By triggering the two multiplexers 207 and 208 in the second, additional data path of the gateway interface, i.e., of the communication interface element, it is possible to control the data transfer, i.e., the transmission of data and/or messages, in particular to establish the direction of the data and/or messages with respect to the message memory. The selection or definition of the data to be transmitted on the second data path may be established via an additional CM/CR (communication mask/communication request) output.

Transmission control over the second data path and selection or definition of the corresponding data and/or messages for the second data path are possible via CM/CR, for example, using identifiers and, in particular with the aid of a command request register and a command mask register and appropriate control identifiers or control bits and via the WRS and RDS outputs. The CPU interface, i.e., in particular interface module 204, containing CPU interface registers 205 and 206, for example, may thus be further used for the transfer, i.e., transmission of data and/or messages from and to the local CPU, i.e., host CPU 210, the transmission of the predefinable data and/or messages, i.e., their transfer being controlled via the above-mentioned control inputs WRS, RDS, CM/CR.

Figure 3:
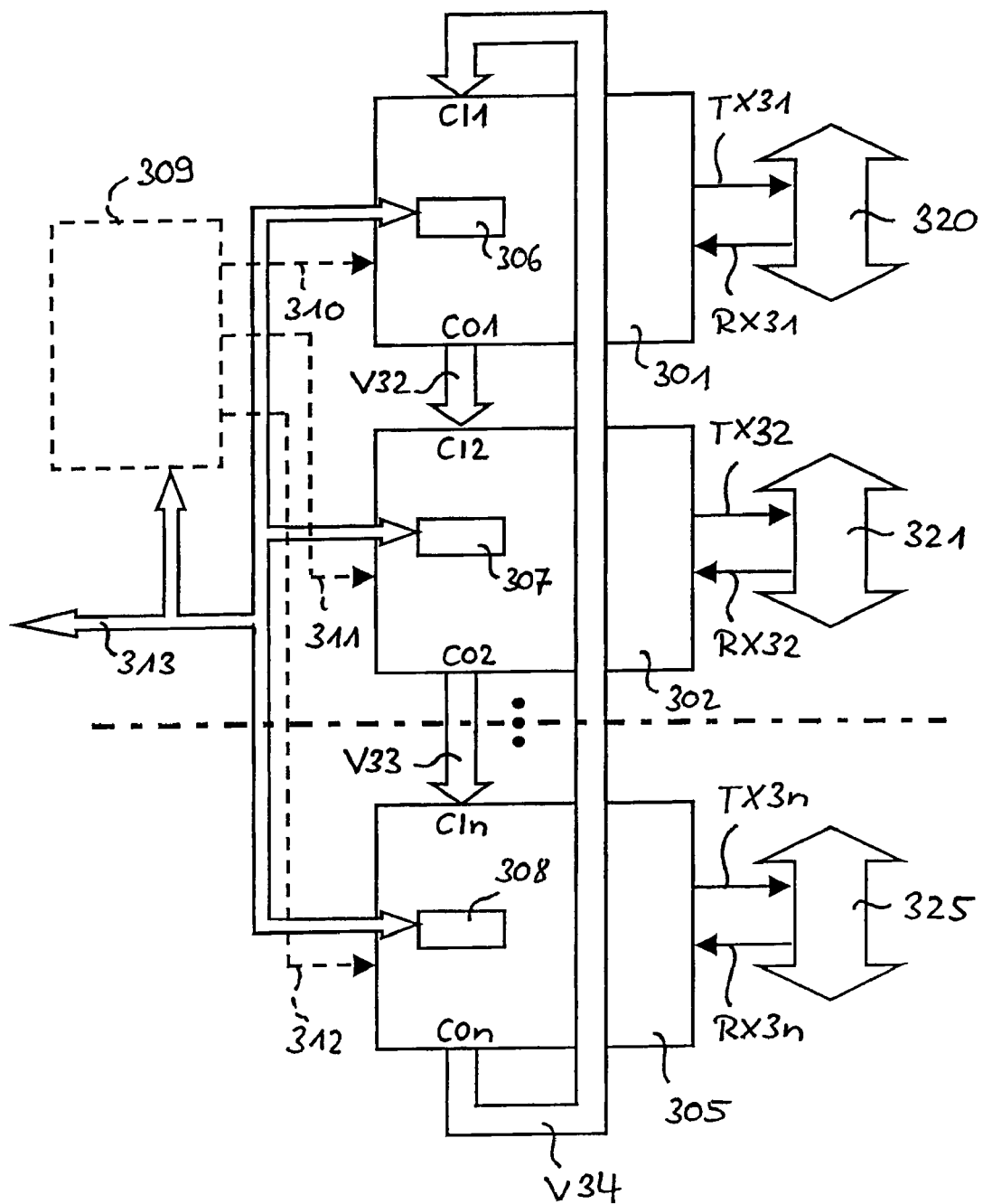
FIG. 3 shows a system having a plurality of communication modules connected to one another, e.g., as a gateway application.

A plurality of communication modules may now be advantageously connected together to form a gateway according to FIG. 3, in a cascade in particular, via this second, additional data path thus introduced. In a preferred embodiment, any desired number of communication modules, CAN modules in particular, may thus be connected together via the gateway interface, i.e., the communication interface element, to form a gateway and advantageously connected in a ring shape from each output CO (cascade output) to input CI (cascade input) of the next communication module. This is also possible for other bus systems, even for different bus systems at the gateway.

Communication modules 300, 301 through 305 are connected in this way in FIG. 3, as CAN modules CAN1, CAN2 through CANn, for example, where n is an integer. Each of these communication modules has a transmit output (TX31, TX32, TX3n) and a receive input (RX31, RX32, RX3n) for connection to a corresponding bus or a corresponding communication link 320, 321 and 325. These communication modules in any desired number are connected together here in a ring shape in particular via sinks V32, V33 and V34. A star connection or the like is also conceivable. Link V32 from output CO1 of communication module 300 is assigned to input CI2 of communication module 301; link V33 from CO2 of 301 is connected to CIn of communication module 305, and link V34 from output COn of communication module 305 is connected to input CI1 of communication module 300.

For the sake of clarity, the registers are now combined into register blocks 306, 307, and 308 and depicted as CPU interface registers CPU IFC, the link to the host CPU being depicted schematically and in a simpler way as CPU bus 313. The control units of the individual communication modules according to FIG. 2 are depicted here in FIG. 3 optionally as an overall gateway control unit, i.e., as a gateway finite state machine 309 and control the transmission on the second data path via outputs 310, 311, and 312 as described previously. This means that outputs WRS and RDS and/or CM/CR in particular are implemented according to FIG. 2 via each of links 310, 311, and 312. The gateway interface, i.e., the communication modules connected via the communication interface elements, thus allow data and/or messages to be transferred between all communication modules over the second data path at a very high rate. In particular a message may also be transmitted from one communication module to a plurality of other communication modules simultaneously.

Such a communication module having a gateway interface, i.e., a communication interface element for implementing a second, additional data path, may either be used as part of a gateway as shown in FIG. 3, or also as an individual controller or individual module without gateway function. It may be set via the configuration of the software or taken into account directly in the control unit, even when communication modules are connected together in the hardware as a gateway, which of these communication modules cooperate as a gateway and which ones work independently, so that a very flexible and selective gateway combination of the existing or desired communication modules is made possible.

This gateway function, i.e., which message is to be relayed from which bus to which other bus, i.e., the second data path, is controlled via the above-mentioned gateway control unit 309, i.e., the gateway finite state machine, which is designed either as an actual state machine in the hardware or as software, in particular running in the host and accessing the gateway control inputs via the above-mentioned special registers, in particular communication request registers or communication mask registers. High-rate data transmission and a high degree of flexibility, in particular free configurability of the number of bus terminals and a high degree of flexibility regarding the composition and design of a gateway, are thus advantageously made possible.

What is claimed is:

1. A communication system, comprising: a plurality of communication modules, each including: a message memory; a two-way communication connection with an associated processing module; a two-way communication connection with a shared communication bus, wherein the two-way communication connections and at least part of the message memory together form a first data communication path between the associated processing module and a device on the shared communication bus; at least one separate input connected to an output of another communication module; at least one separate output connected to an output of another communication module, wherein the at least one separate input and output, and at least part of the message memory, together form a second data communication path between the plurality of communication modules; at least one switching arrangement to select between the first data communication path and the second data communication path; at least one control unit to control the at least one switching arrangement so that at least one of predefined data and predefined messages are transmitted via the second data communication path, while remaining communications are transmitted via the first data communication path.

2. The communication interface element as recited in claim 1, wherein the at least one switching arrangement includes a first switching arrangement and a second switching arrangement.

3. The communication interface element as recited in claim 1, wherein the at least one switching arrangement is a multiplex module.

4. The communication interface element as recited in claim 1, wherein the control unit is implemented in one of software and hardware.

5. A communication system, comprising: at least two communication modules, each including: a communication interface element; a message memory situated in a first data path to and from a shared system bus, wherein at least one of data and messages are transmitted to and from the shared system bus, through the message memory via the first data path; at least separate input to connect to an output of one of the communication modules connected to the shared system bus, and at least one separate output to connect to an input of the another one of the communication modules connected to the shared bus, wherein the separate input and the separate output form a second communication path independent of the shared system bus; and at least one switching arrangement configured to additionally transmit via at least one second data path of the communication module at least one of predefined data and predefined messages; wherein the at least two communication modules are connected via the at least one second data path of each communication module.

6. The system as recited in claim 5, wherein three communication modules are provided, and wherein the three communication modules are connected in a ring shape.

7. A communication module, comprising:
   a communication interface element configured to communicate with a processor module; a message memory situated in a first data path to and from a shared system bus, and wherein at least one of data and messages are transmitted to and from the shared system bus, through the message memory via the first data path;
   at least one separate input to connect to an output of another communication module connected to the shared bus, and at least one separate output to connect to an input of the another communication module connected to the shared bus, wherein the separate input and the separate output form a second communication path independent of the shared system bus; and at least one switching arrangement configured to additionally transmit via the second data path of the communication module at least one of predefined data and predefined messages.

8. A method for controlling a plurality of processors, the method comprising: transmitting at least one of data and messages along a first data path, the first data path including a two way connection between a first processor and a memory of a first communication module, the first data path further including a two way connection between the first communication module and a shared bus; transmitting at least one of data and messages along a second data path, the second data path including at least one separate output connected to an input of a second communication module, the second data path including at least one separate input connected to one of a third communication module and the second communication module, wherein each communication module includes a two way communication connection with the shared bus and a separate input and a separate output; and routing, via one or more switches, transmissions from the first processor to the shared bus via the first data path and to the second communication module via the second data path.

* * * * *